A. A. ABBOTT.
SLEIGH-KNEE.

No. 189,675.  Patented April 17, 1877.

WITNESSES=
J. C. Wilcke
N. Cowles

INVENTOR=
Arthur A. Abbott
By Gridley & Sherburne
Attys

UNITED STATES PATENT OFFICE.

ARTHUR A. ABBOTT, OF CHICAGO, ILLINOIS.

IMPROVEMENT IN SLEIGH-KNEES.

Specification forming part of Letters Patent No. 189,675, dated April 17, 1877; application filed March 30, 1877.

*To all whom it may concern:*

Be it known that I, ARTHUR A. ABBOTT, of Chicago, in the county of Cook and State of Illinois, have invented a new and useful Improvement in Sleigh-Knees; and I do hereby declare the following to be a full, clear, and exact description thereof.

Figure 1:
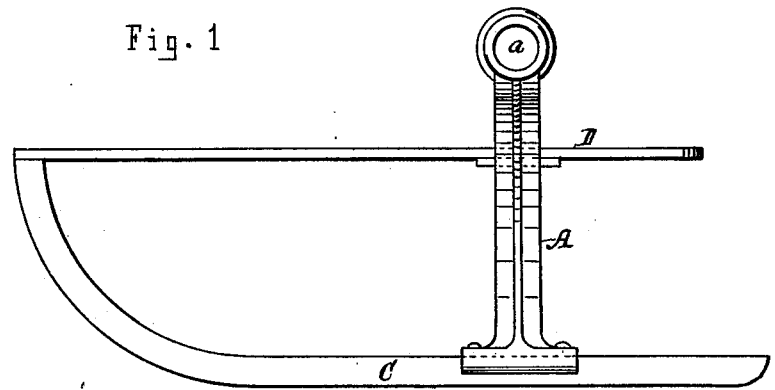
Figure 2:
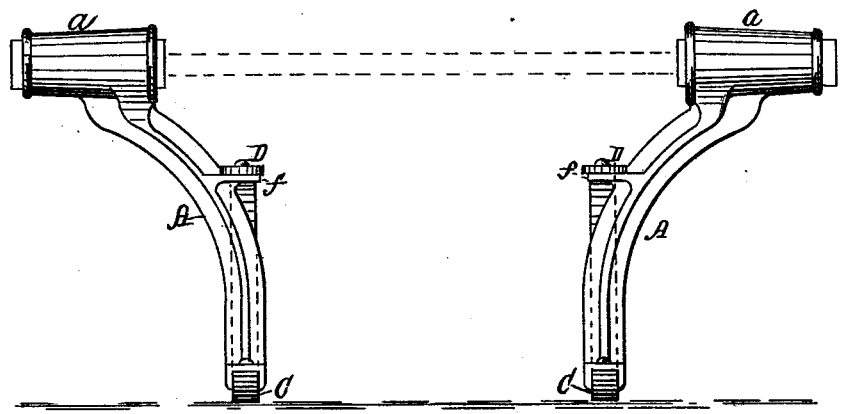

In the drawings, Fig. 1 is a side elevation of a sleigh embodying my said invention, and Fig. 2 is an end view of the same.

My invention relates to that class of sleigh-knees made from cast or malleable iron, and adjusted to the axle of wheel-vehicles; and the object of my invention is to provide a sleigh-knee so constructed that when adjusted upon the axle the runners of the sleigh will follow in the track made by the ordinary sleigh. To that end my invention consists in so curving the lower portion of the knee inward that when adjusted upon the axle the lower end of the knee will be in proper position to bring the runners the same distance apart from center to center that the ordinary sleigh-runners are, and, also, in providing the inner side of the knee with a bracket to receive the rave, and so as to bring the rave in the same vertical plane with the runner.

A represents the knee, which is made of cast or malleable iron, as may be preferred, and is provided at its upper end with a socket or thimble, $a$, through which the axle loosely passes, and is curved inward from the thimble, so that when the thimbles are adjusted upon each end of the axle, respectively, the distance from center to center of the knee at the lower end will be equal to the distance from center to center of the ordinary sleigh-runners.

C represents the runner, which may be constructed in any suitable form.

The lower end of the knee is provided with flanges extending forward and backward on the runner to receive the bolts connecting the knee to the runner, and with downward-projecting flanges forming a groove, into which the upper edge of the runner closely fits.

D represents the rave, which is attached at its forward end to the forward end of the runner, in the usual manner, and at or near its rear end to a bracket, $f$, projecting inward from the inner side of the knee, as shown in Fig. 2.

The location of the bracket upon the curve of the knee is such as to bring the rave centrally over the runner, thereby holding the runners parallel with each other.

I am aware that sleigh-knees made with sockets to receive the axles of wheel-vehicles have been previously known and used; but such knees have been made straight, or nearly so, and thereby bringing the runner immediately under the end of the axle, and as the length of the axle is greater than the width of the sleigh from outside to outside of the runners, the runners will not follow in the track of the ordinary sleigh, which renders their use impracticable, especially in deep snow.

With my invention this difficuly is entirely overcome, as the knees are curved inward, so as to make the width from outside to outside of the runners the same as in the ordinary sleigh.

Having thus described my invention, what I claim as new, and desire to secure by Letters Patent, is—

1. The inwardly-curved cast or malleable iron sleigh-knee A, provided with the thimble $a$ to receive the axle of a wheel-vehicle, substantially as specified.

2. The inwardly-curved cast or malleable iron sleigh-knee A, provided with the inwardly-projecting bracket $f$ to receive the rave, substantially as specified.

3. The combination, with the runner C and rave D, of the inwardly-curved cast or malleable iron knee A, substantially as and for the purpose specified.

ARTHUR A. ABBOTT.

Witnesses:
   N. C. GRIDLEY,
   N. H. SHERBURNE.